(12) United States Patent
Enderich et al.

(10) Patent No.: US 8,906,125 B2
(45) Date of Patent: Dec. 9, 2014

(54) CATCH BOX

(75) Inventors: Andreas Enderich, Esslingen (DE); Conrad Keller, Goppingen (DE); Christian Tauer, Bietigheim-Bissingen (DE); Matthias Traub, Boblingen (DE); Daniel Wirbel, Weinstadt-Beutelsbach (DE)

(73) Assignee: Mahle International GmbH (DE)

( * ) Notice: Subject to any disclaimer, the term of this patent is extended or adjusted under 35 U.S.C. 154(b) by 212 days.

(21) Appl. No.: 13/514,904

(22) PCT Filed: Dec. 6, 2010

(86) PCT No.: PCT/EP2010/068972
§ 371 (c)(1),
(2), (4) Date: Aug. 21, 2012

(87) PCT Pub. No.: WO2011/069965
PCT Pub. Date: Jun. 16, 2011

(65) Prior Publication Data
US 2012/0304605 A1    Dec. 6, 2012

(30) Foreign Application Priority Data
Dec. 9, 2009    (DE) .................. 10 2009 057 563

(51) Int. Cl.
| | | |
|---|---|---|
| *B01D 45/00* | (2006.01) | |
| *F02M 35/10* | (2006.01) | |
| *B60K 13/02* | (2006.01) | |
| *F02M 35/16* | (2006.01) | |
| *F02M 35/022* | (2006.01) | |

(52) U.S. Cl.
CPC .......... *F02M 35/022* (2013.01); *B60Y 2200/14* (2013.01); *F02M 35/10144* (2013.01); *B60K 13/02* (2013.01); *F02M 35/10137* (2013.01); *Y02T 10/146* (2013.01); *F02M 35/10013* (2013.01); *F02M 35/164* (2013.01); *F02M 35/10262* (2013.01)
USPC ..................................... 55/385.3; 123/198 E

(58) Field of Classification Search
USPC ........... 55/385.3, 464, 495, 501; 95/267, 268, 95/272; 96/386; 123/198 E
See application file for complete search history.

(56) References Cited

U.S. PATENT DOCUMENTS

| | | |
|---|---|---|
| 4,965,404 A | 10/1990 | Maeda et al. |
| 5,056,423 A | 10/1991 | Koukal et al. |

(Continued)

FOREIGN PATENT DOCUMENTS

| | | |
|---|---|---|
| DE | 39 24 293 A1 | 1/1991 |
| DE | 42 34 045 C1 | 10/1993 |

(Continued)

OTHER PUBLICATIONS

First Office Action in Chinese (no. English translation available), Jan. 2014.

(Continued)

*Primary Examiner* — Duane Smith
*Assistant Examiner* — Minh-Chau Pham
(74) *Attorney, Agent, or Firm* — Rader, Fishman & Grauer PLLC

(57) ABSTRACT

A catch box may include two air intake sections of an air intake system, wherein the catch box is embodied as water separator at the same time.

20 Claims, 4 Drawing Sheets

(56) References Cited

U.S. PATENT DOCUMENTS

| | | | |
|---|---|---|---|
| 5,794,733 A | 8/1998 | Stosel et al. | |
| 8,562,706 B2 * | 10/2013 | Siber | 55/385.3 |
| 8,562,726 B2 * | 10/2013 | Jun et al. | 96/386 |
| 8,663,370 B2 * | 3/2014 | Slaughter et al. | 95/272 |
| 2004/0261383 A1 * | 12/2004 | Schaerlund et al. | 55/498 |
| 2007/0234903 A1 * | 10/2007 | Xu et al. | 95/267 |
| 2011/0067574 A1 * | 3/2011 | Walz et al. | 96/422 |
| 2013/0008140 A1 * | 1/2013 | Pike et al. | 55/464 |
| 2013/0111860 A1 * | 5/2013 | Kruse et al. | 55/385.3 |
| 2013/0160648 A1 * | 6/2013 | Spryshak | 95/268 |

FOREIGN PATENT DOCUMENTS

| | | | |
|---|---|---|---|
| DE | 102 00 100 A1 | 8/2003 | |
| JP | 1 134515 A | 5/1989 | |
| JP | 3 007295 A | 1/1991 | |
| JP | H07 35750 U | 7/1995 | |
| JP | 9144615 A1 | 3/1997 | |
| JP | 2000168374 A | 6/2000 | |
| WO | WO-01/84035 A1 | 11/2001 | |

OTHER PUBLICATIONS

English Abstract for JP9144615A1, Jun. 1997.

English Abstract for JP2000168374A1, Jun. 2000.

Abstract of DE 42 34 045 C1, Oct. 1993.

Abstract of DE 102 00 100 Al, Aug. 2003.

Abstract of JP 1 134515 U, May 1989.

* cited by examiner

CATCH BOX

CROSS-REFERENCE TO RELATED APPLICATIONS

This application claims priority to German Patent Application 10 2009 057 563.4 filed on Dec. 9, 2009 and PCT/EP2010/068972 filed on Dec. 6, 2010, which are hereby incorporated by reference in their entireties.

TECHNICAL FIELD

The present invention relates to a catch box for the alignment and easier connection of two air intake sections of an air intake system, in particular on a commercial vehicle. The invention additionally relates to an air intake system equipped with such a catch box.

BACKGROUND

In particular with air intake systems of a commercial vehicle, behind or above a driver's cab, a bellows ensures a necessary movement compensation between a cab-fixed first air intake section and a frame-fixed second air intake section, for example an air filter. In order for this bellows to securely find its original location again after a tilting of the driver's cab, a so-called catch box is employed there, which, when the two air intake sections are moved towards each other, aligns these relative to each other, thus making possible an easy connection. Up to now, the duty of the catch box has exclusively been exactly to facilitate this connection.

SUMMARY

The present invention deals with the problem of stating an improved or at least and alternative embodiment for a catch box of the generic type, which is characterized in particular by an auxiliary function.

According to the invention, this problem is solved through the subjects of the independent claims. Advantageous embodiments are the subject of the dependent claims.

The present invention is based on the general idea of embodying a catch box known per se for the alignment and easier connection of two air intake sections of an air intake system, in particular on a commercial vehicle, and as a water separator at the same time and because of this, assign it the auxiliary function of water separation or water discharge from the air system. In this case, the catch box according to the invention is thus not only able to guide the two air intake sections of the air intake system towards each other and join them, but simultaneously carry out a water separation and water discharge in the intake air flow at the same time, so that the air supplied to a combustion engine has less moisture, as a result of which the combustion can be improved and in particular a corrosion risk reduced. The assignment of the water separation function in terms of design can be achieved in an extremely simple manner, so that the catch box according to the invention differs from the generic catch box for example with respect to the manufacturing costs not at all or only marginally so.

With an advantageous further development of the solution according to the invention, the catch box comprises a support structure in the manner of a hip roof, wherein beams of the beam structure are embodied in the manner of channels, i.e. have a U-shaped cross section in particular. The beams of the beam structure thus serve as water draining channels, in which the water separated from the intake air flow can be collected and discharged at the same time. The beams of the beam structure in this case are for example arranged in the manner of spars and purlins and in particular interconnected in a water-conducting manner so that the individual beams of the beam structure form a water discharge system, which discharges the water separated from the intake air flow. Obviously, the beams in this case cannot only be straight but also bent and/or of sloped design. With advantageous further developments, the individual spar-like beams are connected to one or a plurality of ribs or purlins, as a result of which the mechanical stability of the catch box is increased.

According to a particular configuration, the catch box comprises two separating planes which are arranged offset to each other in the through-flow direction. These separating planes are formed by first and second beams, wherein the first and second beams originate from a common plane and have different heights. Here it is advantageous when the first and second beams are alternately arranged next to one another, wherein the spacing between the first beams preferentially corresponds to the width of the second beam and the spacing between the second beams corresponds approximately to the width of the first beams. Thus, the intake air is forced to change the flow direction, wherein the water drops contained in the air impinge on the beams and are thus separated. Preferentially, the first and second beams can be interconnected by a common bridge.

In the case of other configurations, the beam structure can also be designed in the shape of a cone or a truncated cone, in the shape of a pyramid or truncated pyramid or with any other geometry. Here, the base and the intermediate planes of the beams or the beam structure can for example be embodied round or oval, kidney shaped or rectangular.

With a further advantageous embodiment of the solution according to the invention, the catch box comprises a circumferential rim of channel-like design. This rim serves for collecting the water separated on the wall of the air intake sections or the water discharged from the beams of the beam structure, wherein the beams of channel-like design lead into the circumferential rim of channel-like design and by doing so, discharge the water separated from the air flow into the circumferential rim. Here, the beams of the beam structure and the circumferential rim of channel-like design can be embodied unitarily, i.e. in particular as a continuous plastic injection moulding, or as separate components, so that the beam structure and the circumferential rim can be separately produced and subsequently connected in particular clipped, welded or glued together.

According to an advantageous configuration of the invention, the beams arranged in different planes are configured in such a manner that they are arranged offset to one another in flow direction. Thus the air flow is exposed to diverse beams, on which water drops can be separated. With a particular further development of the invention, the beams arranged in different planes overlap in flow direction, so that the contained water drops impinge on a beam and the air can flow through between the beams without major pressure loss. In the case of other configurations, the different planes directly follow one another seen in through-flow direction. Through such configurations, a highly effective air dehumidification or water separation is achieved.

According to an alternative embodiment of the invention, the beams arranged in different planes are spaced from one another in flow direction. Thus, the flow resistance formed by the catch box is significantly reduced.

In the case of further embodiments of the invention, the catch box comprises an assembly bead, over which the bellows is pulled and fixed to the catch box by means of a clamp.

According to other configurations, a water separating cage can be provided in addition to the catch box, which is releasably or non-releasably connected to one of the air intake sections. This connection can be realised for example through welding, gluing, screwing or clamping. In the case of a releasable connection it is advantageous that the water separating cage can be disassembled and thus, accessible from the outside, can be freed of coarse contaminations.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves, without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

Here it shows, in each case schematically.

DETAILED DESCRIPTION

Figure 1:
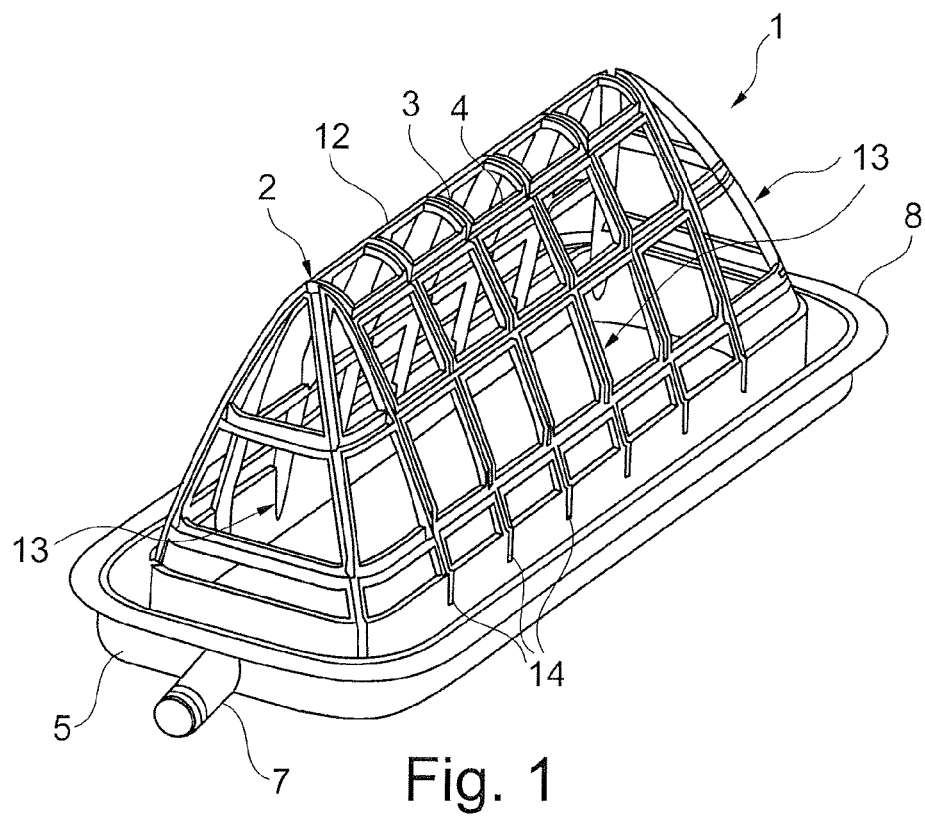
FIG. 1 a view of a catch box according to the invention.

According to FIG. 1, a catch box 1 according to the invention comprises a beam structure 2 in the manner of a hipped roof, with individual beams 3 and 4, which are designed in the manner of channels and in particular have a U-shaped cross section. The beams 3 in this case are designed spar-like, whereas the beams 4 are designed in the manner of purlins, wherein all beams 3 and 4 have in common that with this exemplary embodiment, these are interconnected in a water-conducting manner. In the case of other embodiments, the beams 3, 4 can also be connected through nodal points, in which no water conduction takes place.

The beam structure 2 in the manner of a hipped roof comprises a ridge 12, which with this exemplary embodiment is formed by a U-shaped beam 4, and four surfaces 13 sloping towards the ridge 12, which are swept by the beams 3, 4. With another embodiment, the ridge 12 can also be formed without beams 4. Here, the beams 3 are then embodied bent, so that an imaginary ridge line is formed, from which the surfaces 13 extend. With the exemplary embodiment shown, the purlins designed as beams 4 run parallel to the ridge 12. However, it is also possible to arrange the purlins at an angle to the ridge. Here, the slope angle can be orientated thus that the separated water drops flow to the outside through the gravity and/or the air flow. In the case of the exemplary embodiment shown, the beams 3 designed as purlins run at a right angle to the ridge 12. However, with alternative embodiments, these can also be arranged at other angles, in order to thus achieve a better water discharge or an improved stability of the catch box 1.

In addition to this, the catch box 1 comprises a circumferential rim 5 designed in the manner of a channel, wherein the beams 3 and 4 of channel-like design bring about or make possible a water discharge in this rim 5. According to a particular configuration, the beams 3 each comprise a discharge opening 14, which leads into the rim 5. With the beam structure 2 and the circumferential rim 5 it is possible to form the catch box 1 simultaneously as water separator according to the invention, so that when used in an air intake system 6 (see FIG. 2) it is able to separate moisture or water from an intake air flow.

The catch box 1 according to the invention can be designed from plastic, in particular as plastic injection moulding and because of this be produced cost-effectively on the one hand and dimensionally accurate and precise on the other hand. The circumferential rim 5 of channel-like design additionally comprises a drain 7, via which the water collected in the rim 5 can be discharged. The drain 7 in the case of the present exemplary embodiment is formed as a socket, onto which a drain hose (not shown) for example can be fitted. With other embodiments, the drain 7 can also be embodied as a bore, into which a drain hose with a suitable coupling can be inserted. In addition to this, a sealing element 8 can be provided in the catch box 1, via which two air intake sections 9 and 10 (see FIG. 2) can be interconnected in a sealing manner.

Generally, the beam structure 2 and the rim 5 can be embodied as unitary component, in particular as plastic injection moulding, while it is also conceivable that the beam structure 2 is produced separately and subsequently connected to the rim 5, in particular screwed, clipped, welded or glued.

The catch box 1 according to the invention is employed, in particular, in an air intake system 6, for example in a commercial vehicle, having a first air intake section 9 comprising a bellows 11 for tolerance compensation and a second intake section 10. Here, the first air intake section 9 is connected to a free end of the second air intake section 10 via the bellows 11, wherein in the region of the free end of the second air intake section 10 the catch box 1 according to the invention is arranged according to FIG. 1 and upon connecting of the two air intake sections 9 and 10 brings about an alignment of the two relative to one another and thus facilitates the connection. Such an air intake system 6 can—as mentioned above—be provided for example in the area of a commercial vehicle, in particular in the region of a raw air intake system behind or above a driver's cab, wherein the bellows 11 ensures the movement compensation between the two air intake sections 9 and 10, i.e. for example between an intake system on the cab side and a connecting point (e.g. an air filter) on a frame side. The catch box 1 according to the invention is employed there to ensure that the bellows 11 will securely find its original location again after the tilting of the driver's cab. However, a special advantage of this is that it is additionally designed as water separator and therefore able to extract water from raw intake air, which has a favourable effect on a combustion process and a corrosion risk.

Figure 3:
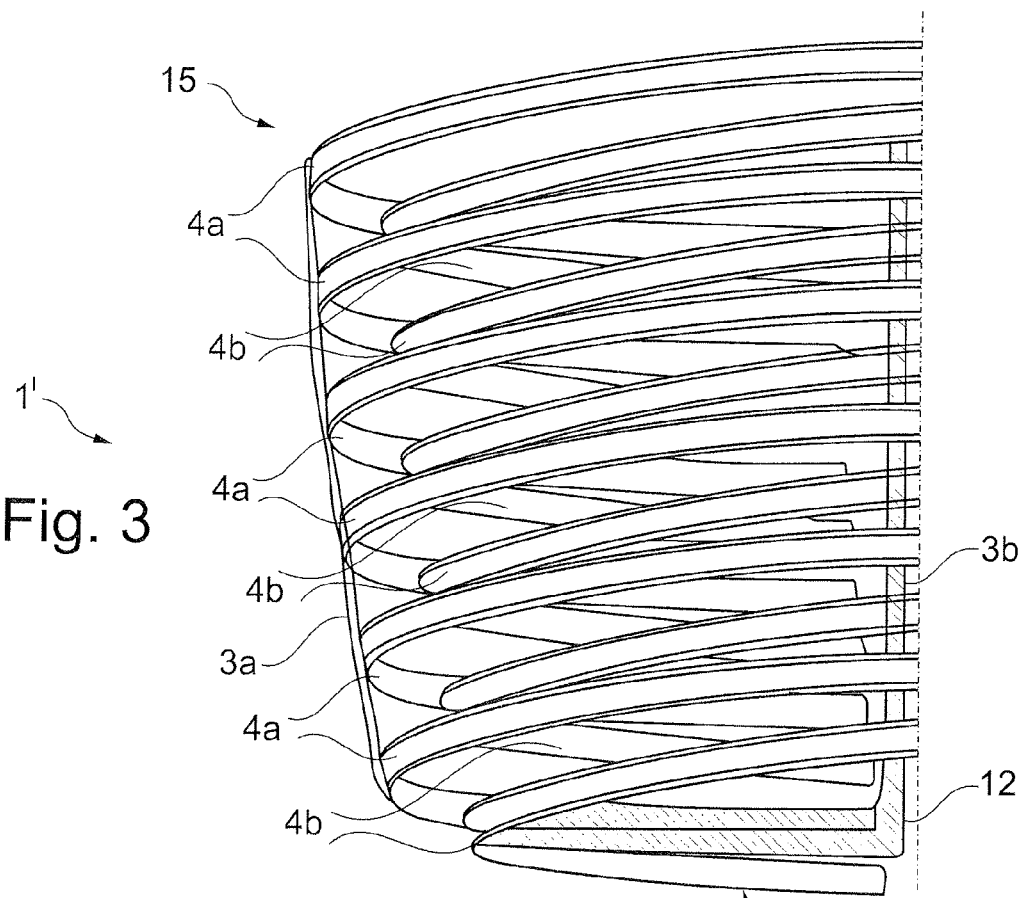

FIG. 3 shows a detail of an alternative configuration of the catch box 1' in perspective view. With this exemplary embodiment, the catch box 1' comprises external spar-like beams 4a and inner beams 4b. The outer beams 4a form an outer separating body 15 and the inner beams 4b form an inner separating body 16. Both separating bodies 15, 16 have the same geometrical shape, in this example an oval, wherein the inner separating body 16 is embodied smaller than the outer separating body 15. The beams 4a and 4b run parallel or sloping with respect to an imaginary or existing ridge 12. Between the beams 4a and 4b one or a plurality of purlin-like longitudinal members 3a or 3b can be provided, which joins the respective beam group. With the shown embodiment, the beams 4a are arranged offset to the beams 4*b* in flow direction, as a result of which the air meets with a low flow resistance and flows through the catch box 1' with a wave movement. Furthermore, the beams 4*a* and 4*b* of a beam group are arranged offset to the preceding beam 4*a* and 4*b*. This is achieved in that the following beam 4*a* and 4*b* has a larger outer cross section than the preceding beam 4*a* and 4*b*. Because of this, the water drops are always carried on in the direction of the rim 5. The offset between the beams 4*a* and 4*b* within a beam group or between the beams 4*a*, 4*b* of the respective other beam group can be combined as desired. With the shown embodiment, the spacing between the beams 4*a* and 4*b* of a beam group is greater than the width of the beams 4*b* and 4*a* of the other beam group arranged in between.

Figure 4:
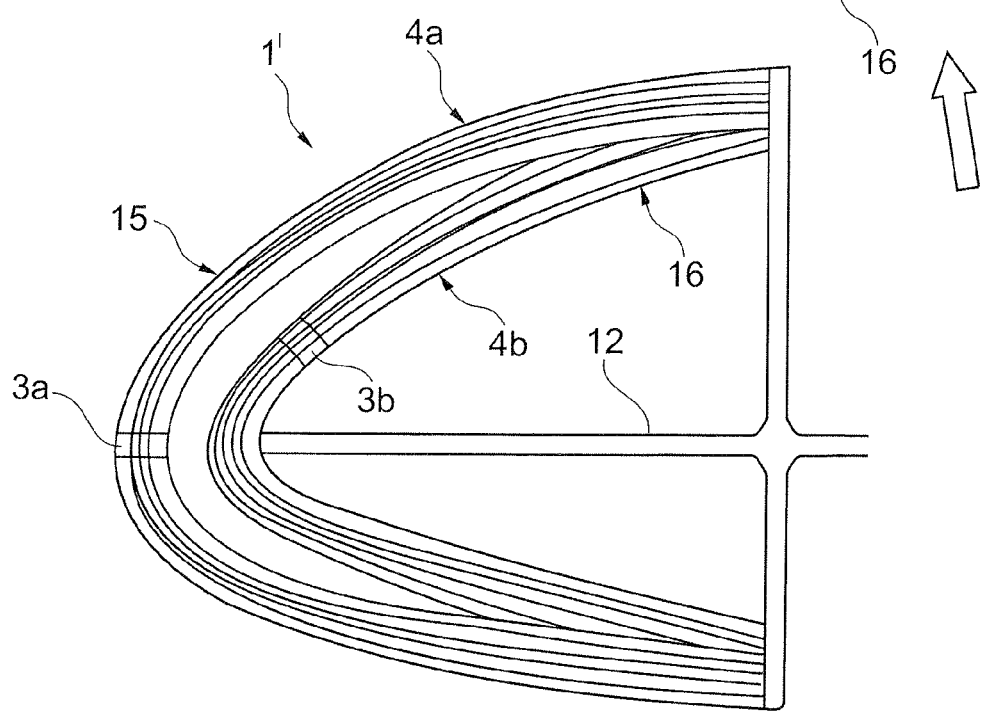

FIG. 4 shows the catch box 1' according to FIG. 3 in lateral view. The beams 4*a* and 4*b* of a beam group are arranged in such a manner, that they overlap in flow direction and thus separate many water drops. The beams 4*b* in this exemplary embodiment are connected to the ridge 12. The beams 4*a* in this exemplary embodiment are not connected to the ridge 12. In other exemplary embodiments, both, none or only one desired beam group can be connected to the ridge 12.

Figure 5:
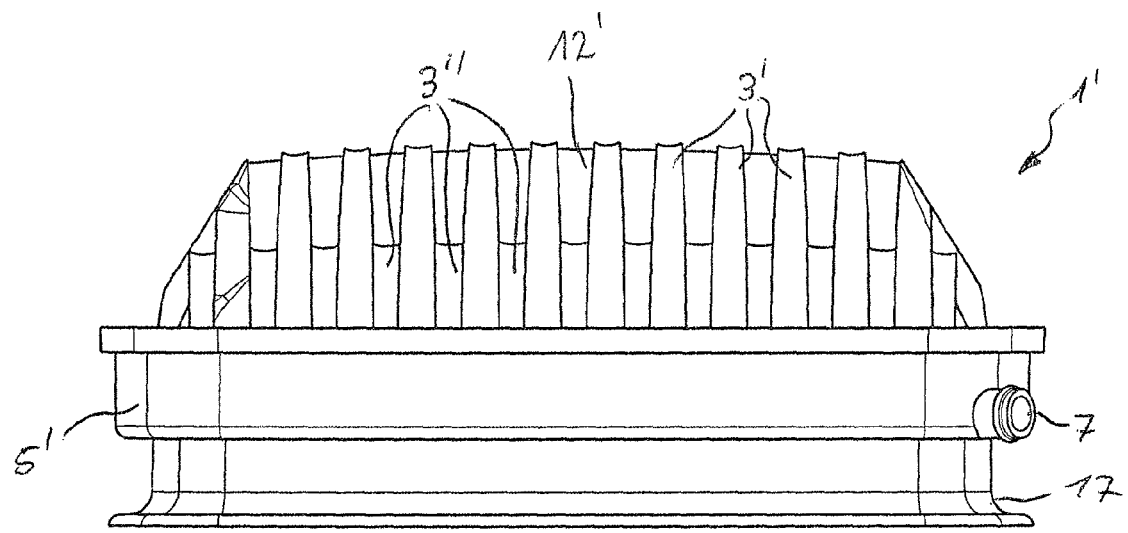
Figure 6:
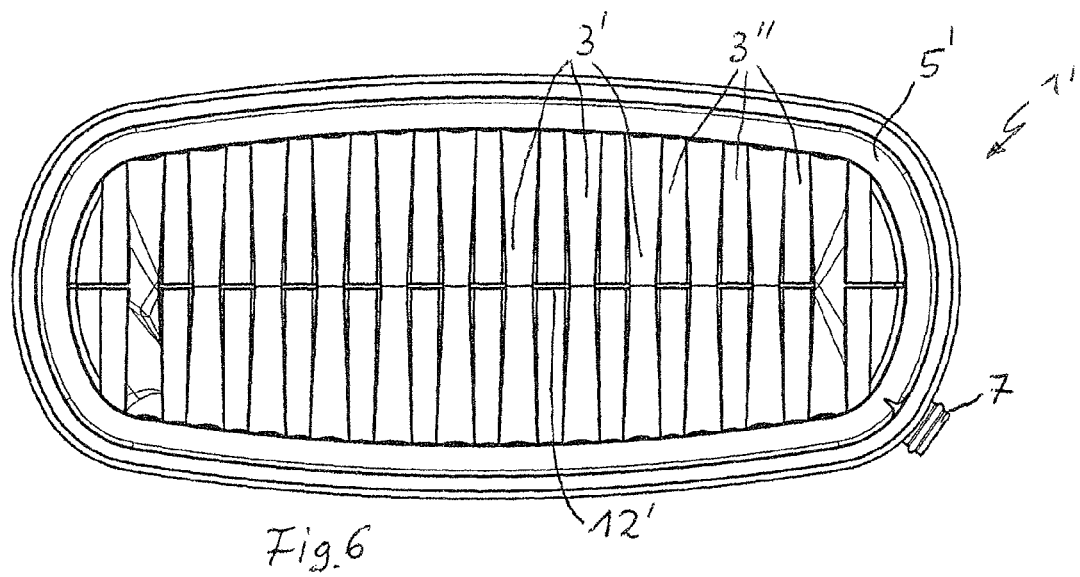
Figure 7:
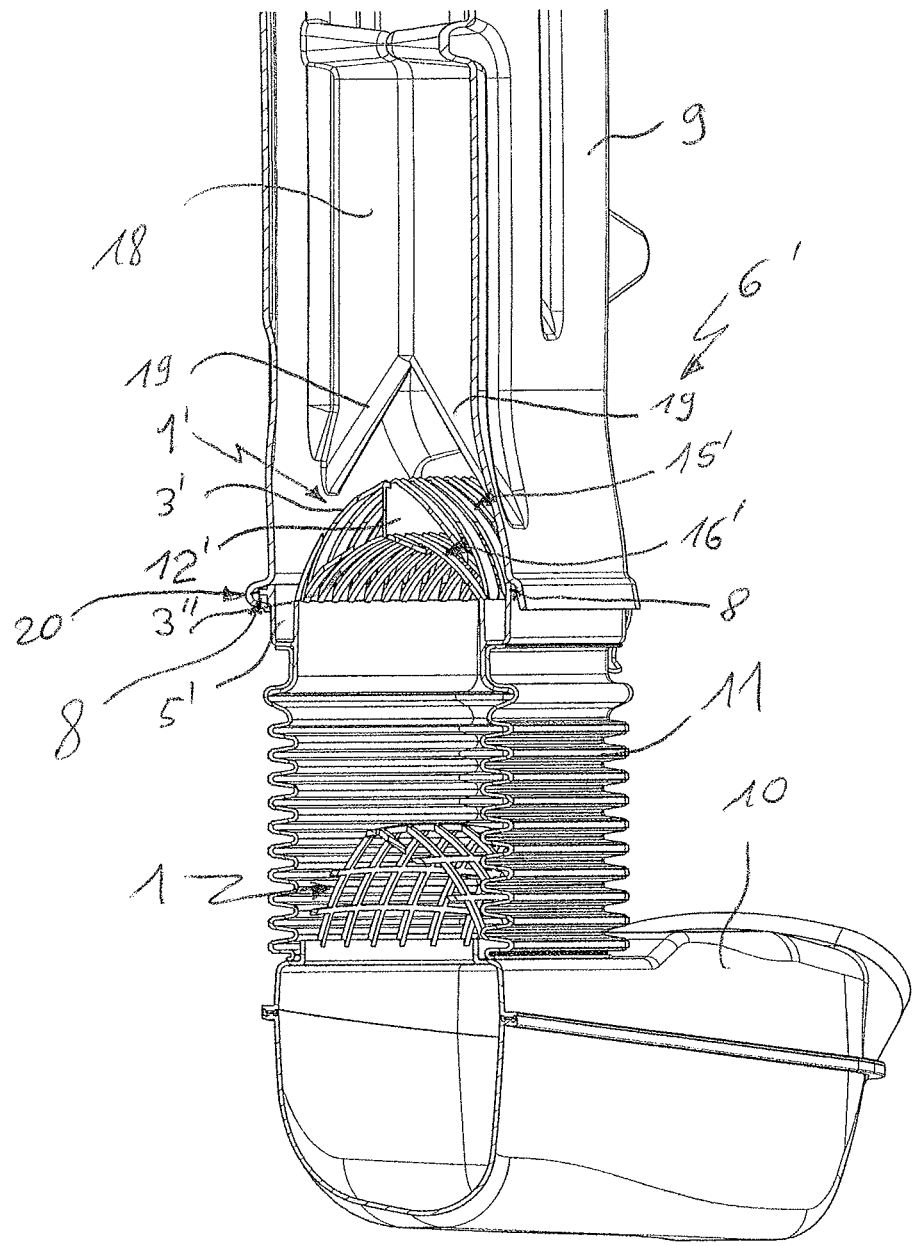

FIG. 5 and FIG. 6 show an alternative configuration of the catch box 1'. Components corresponding to FIG. 1 are provided with the same reference numbers. The beams 3' form the outer separating body 15'. The beams 3" form the inner separating body 16'. The spacing between the beams 3' substantially corresponds to the width of the beams 3". The same applies also to the spacing between the beams 3". In the present exemplary embodiment, the beams 3' and 3" have approximately the same width. In the case of other configurations, the widths of the beams 3' or 3" however can also be embodied differently. The beams 3' and 3" are interconnected by the ridge 12', which is designed in the rib-like. The catch box 1' has a collar 17 below the rim 5', via which the bellows 11 is pulled according to FIG. 7 and fixed thereon by means of a clamp (not shown).

Figure 2:
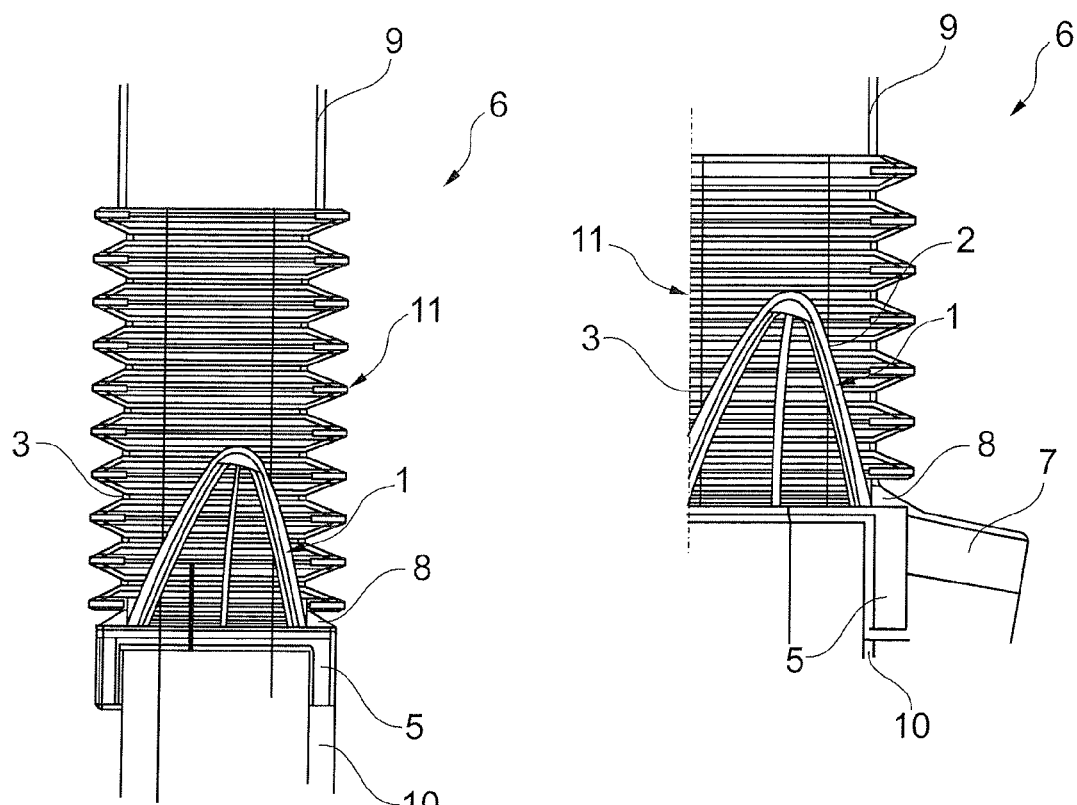
FIG. 2 a representation of an air intake with such a catch box according to the invention, FIG. 3 a detail from an alternative configuration of the catch box in perspective representation, FIG. 4 a lateral view of the catch box according to FIG. 3, FIG. 5 a lateral view of an alternatively configured catch box, FIG. 6 a top view of the catch box according to FIG. 5, FIG. 7 an alternative air intake in perspective view.

FIG. 6 shows an alternative air intake system 6'. Components corresponding to FIG. 2 are provided with the same reference numbers. In the case of this configuration, the air intake system 6' comprises a catch box 1, which is connected to the second air intake section 10. The bellows 11 is put over this catch box 1 during the assembly and fixed, as described above. In addition to this catch box 1, the air intake system 6' comprises a catch box designed as water separating cage 1', which is designed according to FIGS. 5 and 6. The water separating cage 1' on the one hand is releasably connected to the first air intake section 9 and on the other hand to the bellows 11. With this configuration, the water separating cage 1' assumes the main task of separating water contained in the intake air on the beams 3' and 3". This water is removed from the air intake system 6' via the drain 7. The catch box 1 arranged in flow direction following the bellows 11 only has a subordinate water separating function, but in its place the main function of centring the bellows 11. In the case of other configurations, the catch box 1 could also be omitted completely, so that exclusively the water separating cage 1' arranged upstream of the bellows 11 in flow direction is provided and fulfils the function of the catch box 1. Here, the water separating cage 1' is releasably connected to the first air intake section 9. Upon a disassembly of the air intake system 6', the air intake section 9 is removed from the separating cage 1'. During the assembly, the separating cage 1' is connected to the air intake section 9 and fixed by means of clamps or other fasteners (not shown). Thus, the water separating cage 1' arranged in flow direction upstream of the bellows 11 fulfils the functions of the easier assembly and water separation. For the improved water separation in the air intake system 6', a wall structure 18 is provided in the air intake section 9, which channels the inflowing air. Water drops are likewise separated on this wall structure 18. To avoid that the water drops drip in the middle of the air intake section 9, drain slopes 19 are provided, which direct the water drops to the wall of the air intake section 9. From the wall, the drops drain directly into the rim 5' of the water separating cage 1'.

Furthermore, the air intake section 9 has a receiving geometry 20 in which the sealing element 8 with a support structure of the water separating cage 1' can be inserted. This is particularly advantages, when only the water separating cage 1' and for the assembly of the air intake system the bellows 11 has to be brought into position. To this end, the separating cage 1' can be hooked into the receiving geometry 20 and pivoted into position. Thus, an easier alignment and assembly of the bellows 11 is achieved.

The invention claimed is:

1. A catch box, comprising: two air intake sections of an air intake system wherein the catch box is embodied as a water separator at the same time; wherein the catch box has a hipped roof beam structure including beams arranged in the manner of spars and purlins, the beams having channels formed therein.

2. The catch box according to claim 1, wherein the catch box has a circumferential rim designed in the manner of a channel.

3. The catch box according to claim 2, wherein the beams form a water discharge into the circumferential rim.

4. The catch box according to claim 1, wherein the catch box is formed of plastic.

5. The catch box according to claim 3, wherein the circumferential rim designed in the manner of a channel includes a drain for the water discharge.

6. The catch box according to claim 1, wherein the catch box includes a sealing element.

7. An air intake system, comprising: a first air intake section including bellows for tolerance compensation, the first intake section being connected via the bellows to a free end of a second air intake section, a catch box connected to the first intake section and the second intake section in the region of the free end of the second air intake section, the catch box on connecting the two air intake sections being configured to bring about an alignment of the two air intake sections relative to each other.

8. The catch box according to claim 7, wherein the catch box has a hipped roof beam structure including beams having channels formed therein.

9. The catch box according to claim 8, wherein the catch box has a circumferential rim designed in the manner of a channel.

10. The catch box according to claim 9, wherein the beams form a water discharge into the circumferential rim.

11. The catch box according to claim 10, wherein the circumferential rim designed in the manner of a channel includes a drain for the water discharge.

12. The catch box according to claim 7, wherein the beam structure includes beams arranged in the manner of spars and purlins.

13. The catch box according to claim 7, wherein the catch box is formed of plastic.

14. The catch box according to claim 7, wherein the catch box includes a sealing element.

15. The catch box according to claim 1, wherein the catch box has a hipped roof beam structure, wherein the beam structure includes beams having channels formed therein; the beams having at least one of a V-shaped and concave cross section.

16. The catch box according to claim 1, wherein the catch box is formed as plastic injection moulding.

17. The catch box according to claim 1, wherein the catch box is formed of plastic.

18. The catch box according to claim 1, wherein the catch box includes a sealing element.

19. An air intake system, comprising:
a cab-fixed first air intake section including bellows for tolerance compensation;
a frame fixed second air intake section, the cab-fixed first air intake section and the frame fixed second air intake section movable between a disconnected position and a connected position;
a catch box connected to the first intake section, the catch box configured to bring about an alignment of the two air intake sections relative to each other as they move from the disconnected position to the connected position, the catch box having a hipped roof beam structure including beams having channels formed therein.

20. The air intake system according to claim 19, wherein the catch box has a circumferential rim designed in the manner of a channel, and the beams form a water discharge into the circumferential rim.

\* \* \* \* \*